United States Patent

Bachand et al.

Patent Number: 6,101,607
Date of Patent: Aug. 8, 2000

[54] LIMIT ACCESS TO PROGRAM FUNCTION

[75] Inventors: Anthony Paul Bachand; Patrick Samuel Botz; Barbara Ann Smith; Carol Jean Woodbury, all of Rochester, Minn.

[73] Assignee: International Business Machines Corporation, Armonk, N.Y.

[21] Appl. No.: 09/065,888

[22] Filed: Apr. 24, 1998

[51] Int. Cl.[7] .......................... G06F 11/30; G06F 15/163
[52] U.S. Cl. ........................................ 713/201; 709/302
[58] Field of Search ............................... 709/302; 380/4; 713/200, 201; 395/712, 682

[56] References Cited

U.S. PATENT DOCUMENTS

| | | | |
|---|---|---|---|
| 5,404,488 | 4/1995 | Kerrigan | 395/425 |
| 5,490,216 | 2/1996 | Richardson, III . | |
| 5,748,890 | 5/1998 | Goldberg | 395/188.01 |
| 5,946,685 | 8/1999 | Cramer | 707/10 |

*Primary Examiner*—Joseph E. Palys
*Assistant Examiner*—Ronald D Hartman, Jr.
*Attorney, Agent, or Firm*—Lawrence D. Maxell

[57] ABSTRACT

A method, system and computer program product for selectively restricting access to a program function in a computer system having an operating system security mechanism operates via an application programming interface (API) that includes a program function registration API function, an authorization selection API function, and an authorization query API function. In response to a call to the API registration function, the program function is registered in a repository in the computer system. After the program function has been registered, a system administrator can select user authorizations using a software tool that includes calls to the authorization selection API function. The system administrator may select whether a particular user or group of users is authorized to access each registered program function. A programmer can embed a call to the authorization query API function in an application program, which includes or calls the program function. When the application program reaches the call to the authorization query API function, the function is executed and returns an indicator or value indicating whether or not that user is allowed to access the program function.

15 Claims, 15 Drawing Sheets

LIMIT ACCESS TO PROGRAM FUNCTION

BACKGROUND OF THE INVENTION

1. Field of the Invention

The present invention relates generally to computer security and, more specifically, to methods and systems for restricting selected users' access to selected programs or portions of programs.

2. Description of the Related Art

Operating systems and similar software often include security facilities or mechanisms that a system administrator may use to restrict selected users' access to selected program functions or resources. For example, a network administrator may allow only a selected group of users on the network to modify data in a database and prevent other users from doing so. Such security mechanisms typically only allow an administrator to limit access to a program as a whole; they cannot be used to limit access to portions of a program.

In other instances, the security feature may be included in an application program itself. For example, an accounting program package may include a feature that allows an administrator to select which users have access to which functions. Certain users may be given access to, for example, the Accounts Payable functions of the program but not the Accounts Receivable functions, while other users may be given access to the Accounts Receivable functions but not the Accounts Payable functions. Such a security feature may be implemented by hard-coding it into the program. In other words, in response to a user's request to access a certain program function, a code segment in the program obtains the identity of the user (either internally if the user is required to enter a username into the program, or externally from the operating system) and compares the identity to a list of authorized users. If the list indicates that the user is authorized to access that function, the program proceeds to execute the function as requested. If the list indicates that the user is not authorized to access that function, the program does not execute the requested function and may output an error message advising the user that he or she is not authorized.

Hard-coding the security feature into an application program may be reasonably convenient if the computer system is only running a single program, but if the computer system is running many programs, as is of course typical in networked business computing systems, it becomes inconvenient for the system administrator to assign, track and maintain the proper authorizations for all of the programs. Different programs may be written by different vendors and thus may have completely different user interfaces by which the system administrator manages user authorizations. Compounding the difficulty is that a computer network may include different types of computer platforms, such as personal computers operating under the MICROSOFT WINDOWS operating system and IBM AS/400 platforms operating under OS/400. The method by which the network administrator must manage authorizations on one platform may be different from the method by which the network administrator must manage authorizations on another platform.

It would be desirable to provide a consistent, convenient means for managing user authorizations that is platform-independent and that can be used with any application program. These problems are satisfied by the present invention in the manner described below.

SUMMARY OF THE INVENTION

The present invention relates to a method, system and computer program product for selectively restricting access to a program function in a computer system having an operating system security mechanism. The term "program function" is used in this patent specification to refer to any portion of a computer program that defines a task or goal, and includes within its scope, for example, code modules and other groups of sequential lines of code, an object or object method in an object-oriented program, and subprograms that may be defined by a programming language and referred to in the narrower context of that programming language as a procedure, function, subroutine or similar term. The invention allows a user having special use privileges that are superior to those of other users, who is referred to in this patent specification as an administrator or superuser, to select and set the authorization of each user of the computer system to either grant or deny the user access to the program function from an application program executing or running on the computer system under the user's control. Unlike prior systems in which an administrator can grant or deny access to an entire program as a whole using the security mechanism provided by the operating system, the present invention allows the administrator to grant or deny user authorizations to portions of a program.

In accordance with the method of the present invention, the program function is first registered in a repository in the computer system. The term "repository" as used in this patent specification includes within its scope a conventional operating system registry, but more broadly includes other suitable data storage structures as well. A registry is a well-known computer operating system data structure. Registries are included in, for example, the IBM AS/400, WINDOWS 95 and WINDOWS NT operating systems and are typically used, for example, to register exit points. It is known that an application program may call an operating system facility or function to register something in the registry. What can be registered depends upon the type of platform. (In accordance with convention in the art, the term "platform" may sometimes be used in this patent specification to refer to a computer and its operating system as a cohesive unit.) In a WINDOWS 95 or a WINDOWS NT platform, for example, a file name can be registered. In an OS/400 platform, where the basic unit of data manipulated by the system is known as an object, an object can be registered. The program function may be registered at any convenient time prior to execution by a user of an application program that includes the program function, such as at the time the program is installed in the computer system using an installation program. The system and program product of the present invention include application program interface (API) functions relating to program function registration. A programmer can embed calls to the API registration functions in the installation program.

In certain embodiments of the invention, a proxy file may be created. As with the registration step, the proxy file may be created at any convenient time prior to execution of an application program that includes the program function, such as at installation time. The term proxy "file" is used in this patent specification for convenience to refer broadly to an entity that can be protected from unauthorized access using the underlying operating system security mechanism, and includes within its scope all files, objects and other suitable entities known in the art.

After the program function has been registered, the administrator can select user authorizations using a suitable software tool. The software tool receives input data from the administrator that indicates whether a selected user is granted or denied access to a selected program function. In certain embodiments of the invention the software tool may include a graphical user interface (GUI) to enhance ease of use. Whether graphical or not, the user interface lists the registered program functions for the administrator. In embodiments in which proxy files are created, each registered program function corresponds to a proxy file. As explained below, the proxy file in effect becomes a "proxy" security mechanism for that program function. Via the user interface, for each program function or group of program functions in the list, the administrator can set an authorization for each user or group of users, indicating whether a user or group of users is granted or denied access to each program function or group of program functions. (in certain embodiments of the invention, the software tool may provide means for grouping the program functions and/or users, such that the administrator can, for example, grant or deny a user access to a pre-defined group of program functions without specifying them individually. The groupings may be hierarchical, flat or any other suitable arrangement.) In embodiments of the invention in which a proxy file is created, the software tool sets user authorizations by calling or invoking the integral security mechanism of the operating system to set the user authorization to a proxy file corresponding to the registered program function. The system and program product of the present invention include API functions relating to selecting user authorizations. A programmer may thus embed calls to the API functions in the authorization selector software tool.

The API of the system and program product includes an authorization query function. A programmer can embed a call to the authorization query function in the application program that includes or calls the program function to be protected against unauthorized use. The function call identifies a program function. The programmer may embed the call, for example, immediately preceding some lines of code that constitute the program function to be protected, and the function call would identify that corresponding program function by a unique name, code or other identifier. After the application program has been installed on the computer system and the program function or functions registered as described above, a user can cause the computer system to execute the application program in the conventional manner. When the application program reaches the call to the authorization query function, the function is executed and returns an indicator or value indicating whether or not that user is allowed to access the program function.

The authorization query function may, in certain embodiments of the invention in which a proxy file is created, determine the user's authorization by attempting to access the proxy file corresponding to the program function identified in the function call. The security mechanism indicates whether or not the user is authorized to access the proxy file, and the authorization query function in turn indicates whether or not the user is allowed to access the corresponding program function. The application program may include branching instructions or similar program flow-controlling code that, in response to the value returned via the authorization query function call, either proceeds to execute the program function or branches around it. The present invention is not, however, limited to any particular programming language.

The term "computing system" as used in this patent specification includes any system of one or more general-purpose platforms, which may be networked together. Indeed, the present invention may be particularly advantageous in a networked computing system. For example, even if one or more computers on the network lack a suitable repository and/or an operating system security mechanism, the invention may advantageously be used to grant or deny access to users operating such computers so long as at least one other computer on the network includes a suitable repository and an operating system security mechanism.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF PREFERRED EMBODIMENTS

Figure 1A:
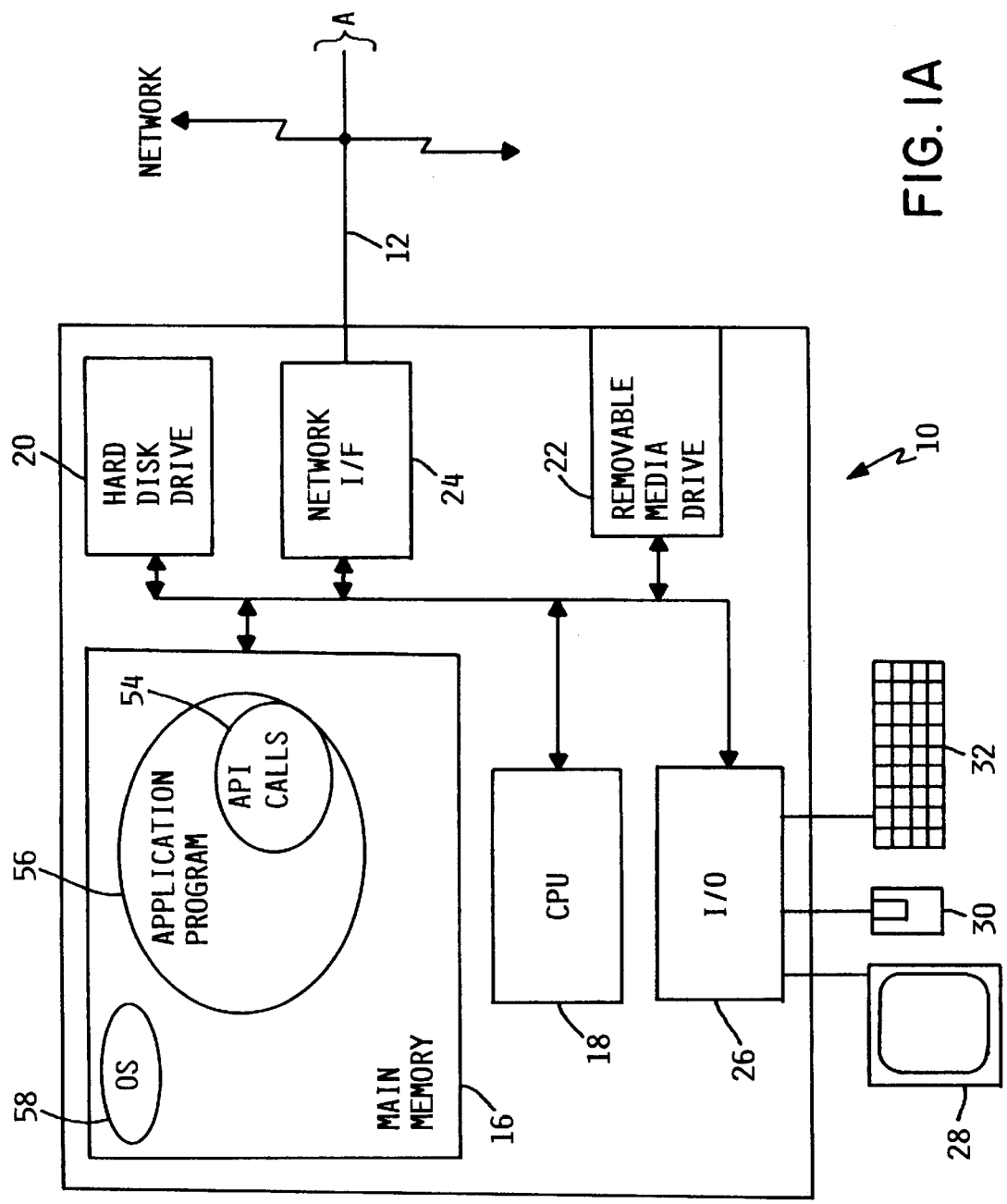
FIG. 1 is a block diagram of a computer system that allows an administrator to selectively limit users' access to an application program function.
Figure 1B:
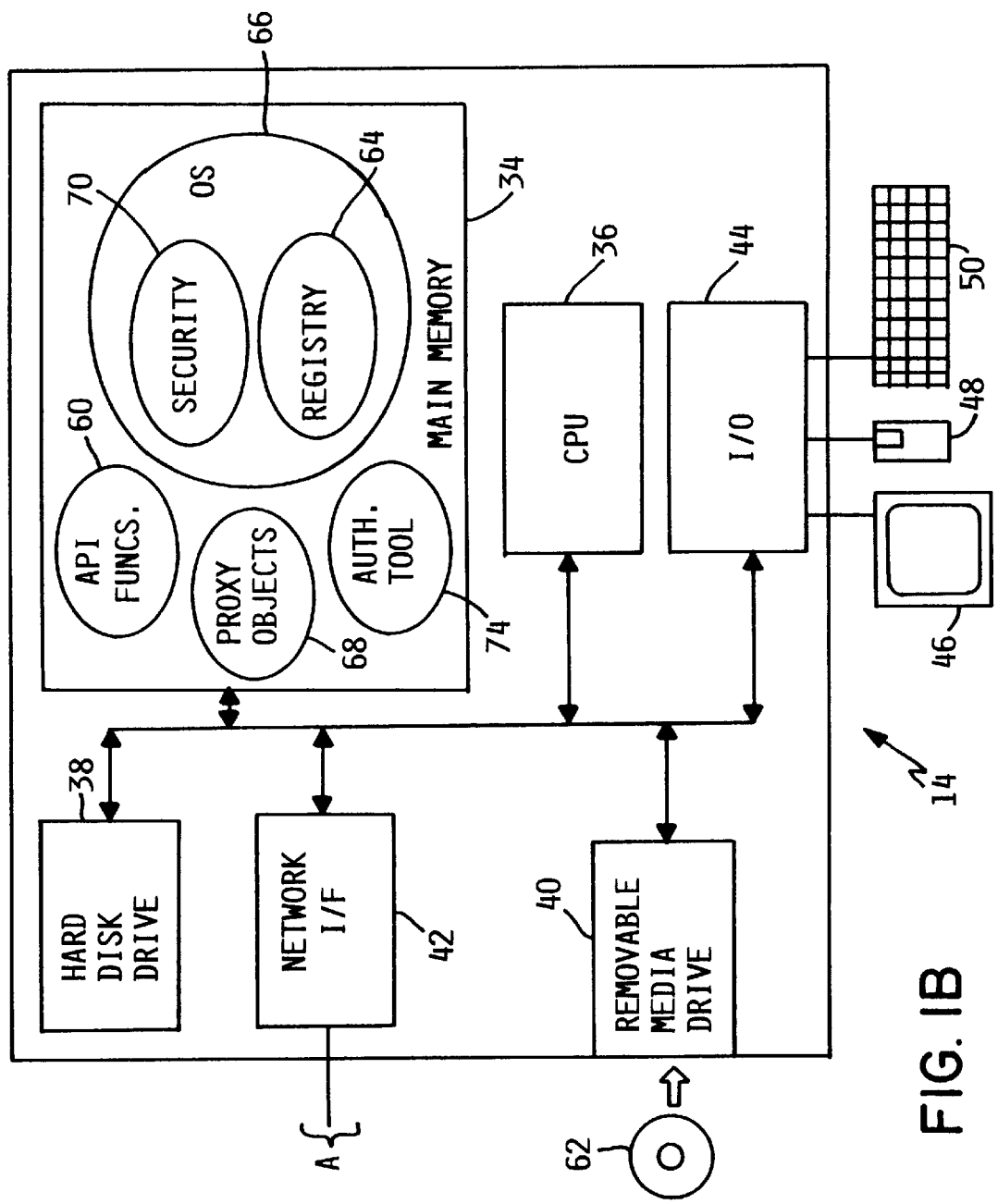

As illustrated in FIG. 1, the invention may be embodied in a system that includes one or more computers. In the illustrated embodiment, a client computer 10 communicates via a network 12 with a server computer 14. As indicated, other client computers (not shown) may be connected to server computer 14 via network 12 as well, but for purposes of clarity only client computer 10 is shown. Although computer 10 is denominated a "client" and computer 14 is denominated a "server," the present invention is operable under computing system architectures and paradigms other than client-server.

Computer 10 includes hardware elements suitable for providing a general-purpose computing environment for a user, such as a suitable main memory 16, central processing unit 18, hard disk drive 20 or similar non-volatile data store, removable media drive 22 such as a floppy disk or CD-ROM, network interface circuitry 24, input/output circuitry 26, video display 28, mouse 30 or similar pointing device, and keyboard 32. Computer 10 includes similar suitable hardware elements, such as main memory 34, central processing unit 36, hard disk drive 38, removable media drive 40, network interface circuitry 42, input/output circuitry 44, video display 46, mouse 48, and keyboard 50.

The elements of computers 10 and 12 are interconnected in the conventional manner, in which each element in the computer communicates with one or more of the others via one or more busses.

Figure 2:
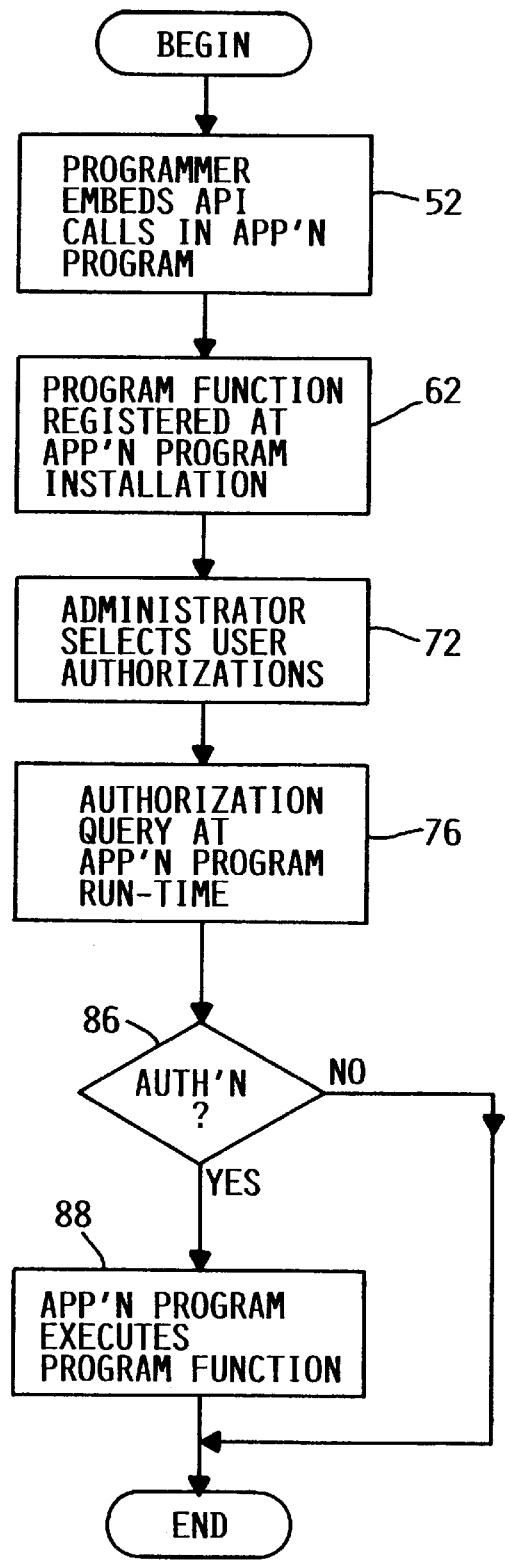
FIG. 2 is a flow diagram illustrating the methods of the present invention.
Figure 3:
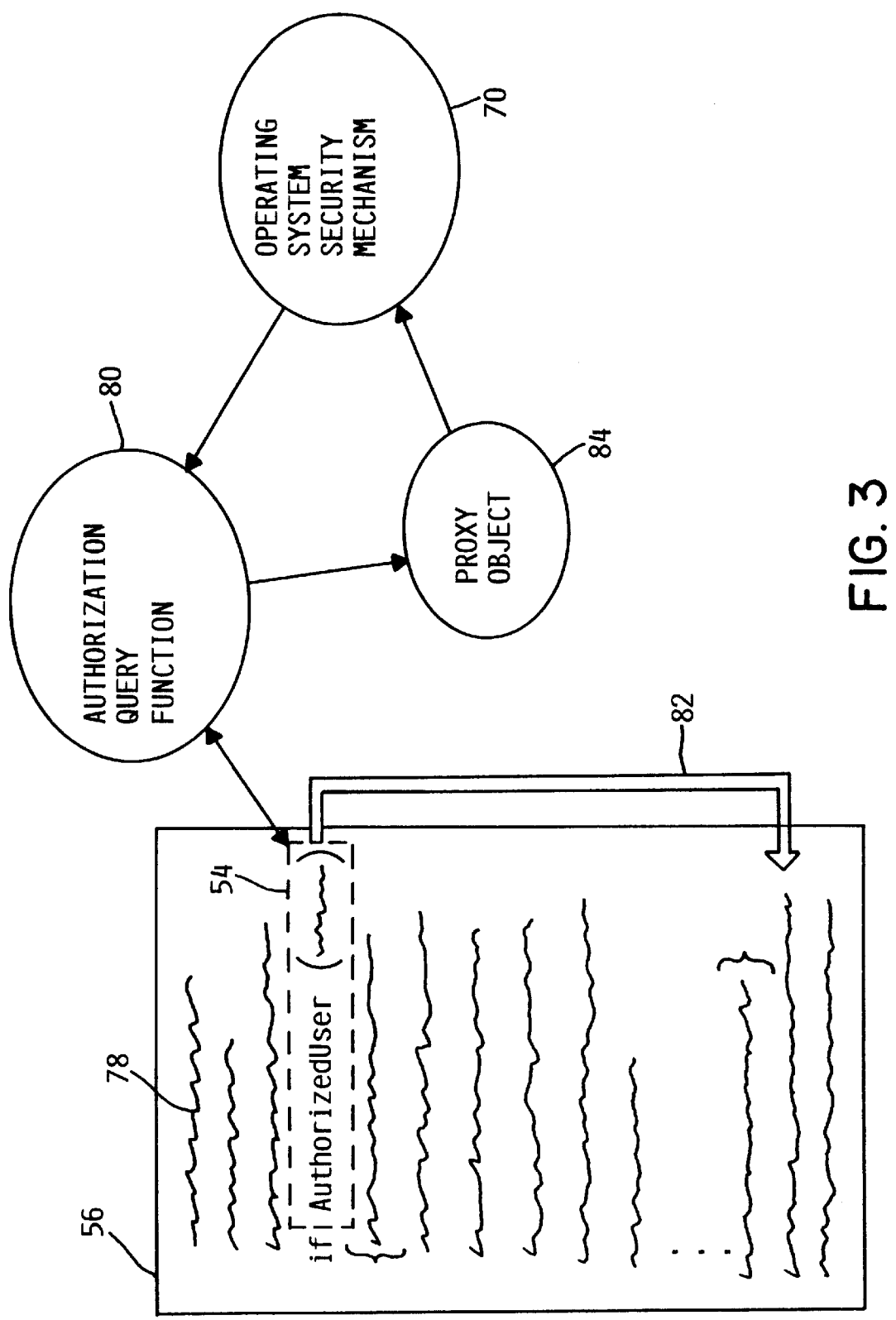
FIG. 3 illustrates selectively executing a program function in response to an authorization query.

FIG. 2 illustrates a method by which access to selected program functions may be restricted to selected users of computer 10 and similar user computers on network 12. At step 52 a programmer embeds or includes application program interface (API) calls 54 (FIGS. 1 and 3) in an application program 56 (FIGS. 1 and 3). With reference to FIG. 1, a user may initiate and control the execution of application program 56 on computer 10 in the conventional manner. Computer 10 includes a conventional operating system 58 to facilitate such program execution and other functions typically performed by operating systems. Although the software elements of computer 10 that are principally relevant to the present invention, namely application program 56 and its API calls 54, are shown for purposes of illustration as existing or residing in memory 16, persons skilled in the art to which the invention relates will understand that the software is illustrated in this manner because software is typically executed from such main memory and fetched into the main memory on an as-needed basis from other sources such as hard disk drive 20 or network 12. As such persons will appreciate, these software elements may or may not actually exist simultaneously or in their entirety in memory 16. By the same token, although application program 56 is illustrated as existing or residing in computer 10 for purposes of clarity, in a true client-server computing system a client portion would exist in computer 10 and a server portion would exist in computer 12.

An API is a well-known programming device that is typically embodied in a computer program product (e.g., a disk on which the computer program or software is recorded) that is typically purchased by an independent software vendor, who uses the API program product as a component to develop other software for sale to end-users, such as the contemplated user of computer 10. (The terms "software" and "program" are used synonymously in this patent specification.) In the present invention, the API includes API functions 60 in computer 12. API functions 60 may be delivered to computer 10 via a program product 62 that interfaces with drive 40 or via a network 12 program product. In accordance with the API modularity concept or paradigm, only calls to API functions 60 are included in application program 56; the programmer is relieved of any task of having to incorporate or integrate the code itself of functions 60 in application program 56.

A programmer or similar person may embed API calls 54 in application program 56 in any suitable manner using computer 10, or the programmer may use computer 12 or any other suitable computer to do so and then transfer application program 56 to computer 10. Although this step of the process is described as embedding API calls 54, one is not limited to adding API calls 54 to an existing application program, but of course may write or otherwise obtain a complete application program that initially includes API calls 54. API calls 54 embedded in application program 56 are important to the invention, but the functional nature of application program 56 is not. Application program 56 may be any suitable type of program. In a computer 10 used in a business, application program 56 may, for example, perform an accounting, payroll, marketing, inventory, manufacturing, or engineering function, or any other suitable function for which a business may use a computer. The term "application program" is used broadly to refer to any software that is not the operating system itself. Thus, application program 56 may not only be business software but alternatively may be a system utility or similar program that only a limited number of end-users would use and that typical businesspersons or clerical personnel would not use.

Returning to FIG. 2, at step 62 a program function is registered. As explained further below, the program function may be, for example, a group of several lines of code in application program 56 that are to be executed if the user under whose control application program 56 is executed has the proper authorization and bypassed if the user does not have the proper authorization. Step 62 may occur at the time application program 56 is installed on computer 10. Typically, an application program is installed using an installation tool that copies the proper program files and performs other installation tasks. For example, installation programs are known that, among other functions, register exit points of the application program in a registry of the computer. Indeed, computer 12 includes such a registry 64 as an integral part of its operating system 66. In the present invention, however, the installation program (not shown) includes a call to an API function 60 (FIG. 1) that registers the program function in registry 64. The preferred registration function is described in further detail below, but it is sufficient to note that the function call identifies the program function by a suitable unique identifier, and in response to the call the registration function registers the program function in registry 64. In addition, the registration function creates a proxy object 68, the purpose of which is described further below. It is sufficient to note that proxy objects 68 are entities that can be protected by setting user access authorizations using the security mechanism 70 that constitutes another integral part of operating system 66. Many such program functions that exist in many different application programs may be registered in this manner as each application program is installed on computer 10 or other computer of the computing system. A corresponding proxy object 68 is created for each registered program function.

At step 72 an administrator or similar user having special privileges allowing him or her to oversee or control other users' use of the computing system resources selects the other users' authorizations. The administrator can use an authorization selector tool 74 (FIG. 1) that displays on display 46 (FIG. 1) a list of such users, a list of registered program functions, and any other information that may be useful to the administrator in setting each user's authorization. Persons skilled in the art will appreciate that tool 74 can readily obtain a list of users from security mechanism 70, as security mechanism 70 is conventionally used by an administrator to set the authorizations of users to access objects on the computing system. The term "object" is used (as in proxy objects 68) because a preferred computer 14 is an IBM AS/400. Proxy objects 68 are analogous to entities referred to as files in many other platforms, such as a WINDOWS 95 or WINDOWS NT platform.

The administrator makes the selections using keyboard 50 and mouse 48 (FIG. 1). Tool 74 preferably has a graphical user interface (GUI) that presents the information to the administrator and receives input from the administrator using a system of windows, buttons, data entry boxes or other devices in accordance with well-known GUI methodologies and concepts. For each listed user, the administrator may select whether that user is authorized, i.e., granted or denied permission, to access each listed program function. As described further below, the administrator may choose not to set an authorization for each function and may rely upon default settings. As also described further below, the administrator may set authorizations for groups of functions rather than each function individually. Note that although FIG. 1 illustrates tool 74 as existing on computer 14, it may exist on another computer on the computing system, and the administrator may perform step 68 using such other computer or perform it remotely using any other computer via network 12.

Although authorization selector tool 74 may include any suitable features and perform any suitable functions, its important feature with respect to the invention is that it includes API calls to an API function 60 that sets the authorizations, as well as API calls to an API function 60 that retrieves information about the registered program functions from registry 64. These API functions are described in further detail below, but it is useful to note that the API function 60 that sets the authorizations does so by calling or invoking the services of security mechanism 70 to set the user's authorization to access the proxy object 68 corresponding to the program function.

Step 76 occurs during execution of application program 56, after application program 56 has been installed and the administrator has set user authorizations to access its program functions. As conceptually illustrated in FIG. 3, computer 10 executes lines 78 of software code in the conventional manner. Embedded in lines 78 as described above is the API call 54 to an authorization query API function 80, which is one of API functions 60 (FIG. 1). API call 54 may have any suitable syntax, name, format and arguments, and it is illustrated in FIG. 3 as being the argument of an "if" statement and as having the function name "AuthorizedUser" only for purposes of illustration. The lines 78 of code between API call 54 and the end of arrow 82 define the protected program function. Authorization query API function 80, which is described in further detail below, attempts to access a proxy object 84, which is one of proxy objects 68 (FIG. 1). Proxy object 84 corresponds to the protected program function. As indicated by step 86, in response to the attempted access of proxy object 84, security mechanism 70 either permits or refuses the attempt. If authorization query API function 80 receives a refusal, it returns a value to function call 54 indicating that access is "not allowed." Because function call 54 is the argument of the "if" statement, the "if" statement causes execution to branch around the protected program function as indicated by arrow 82. Otherwise, if a value indicating that access is "allowed" is returned to function call 54, the "if" statement causes execution to proceed through the program function, as indicated by step 88.

Figure 4A:
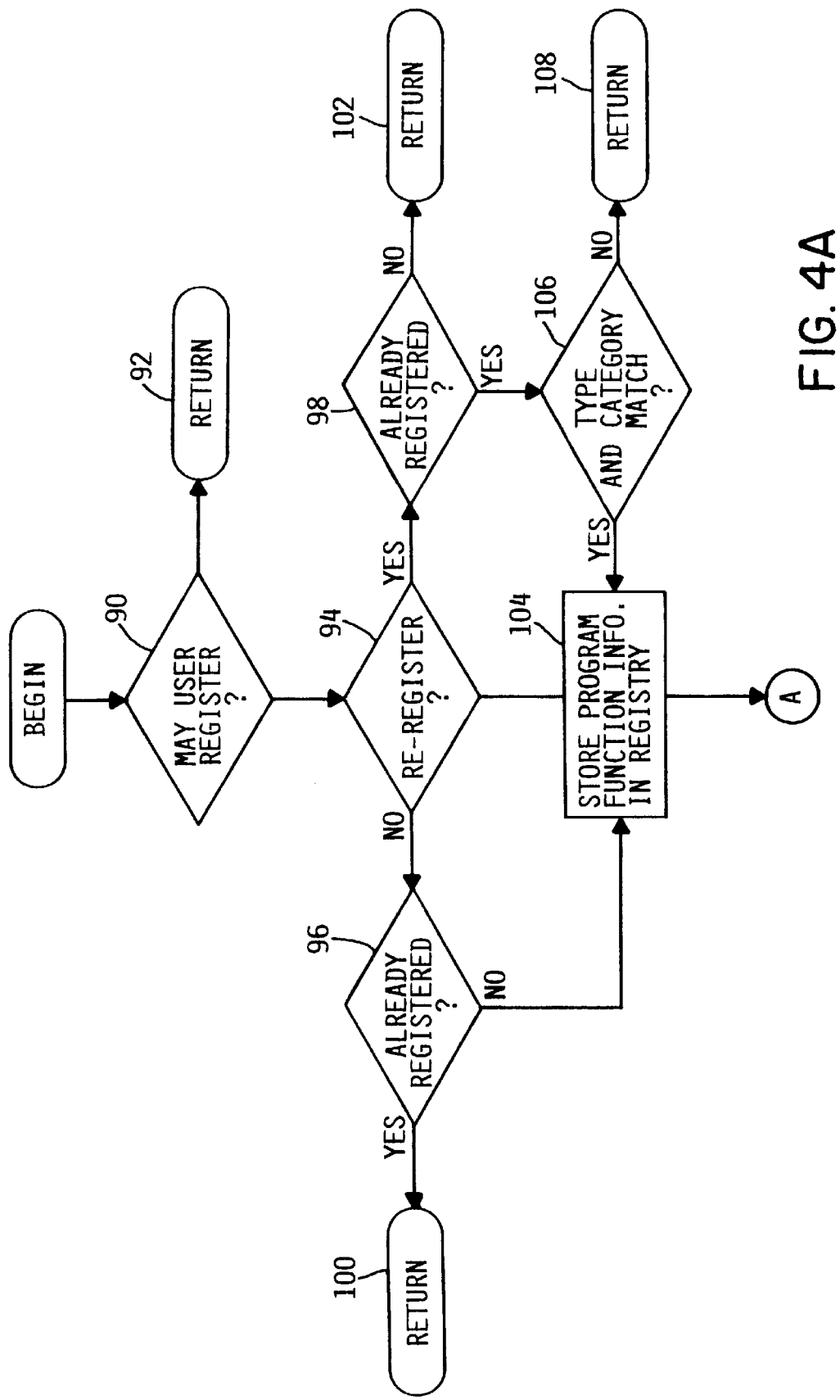
FIG. 4 is a flow diagram illustrating a method for registering and re-registering a program function.
Figure 4B:
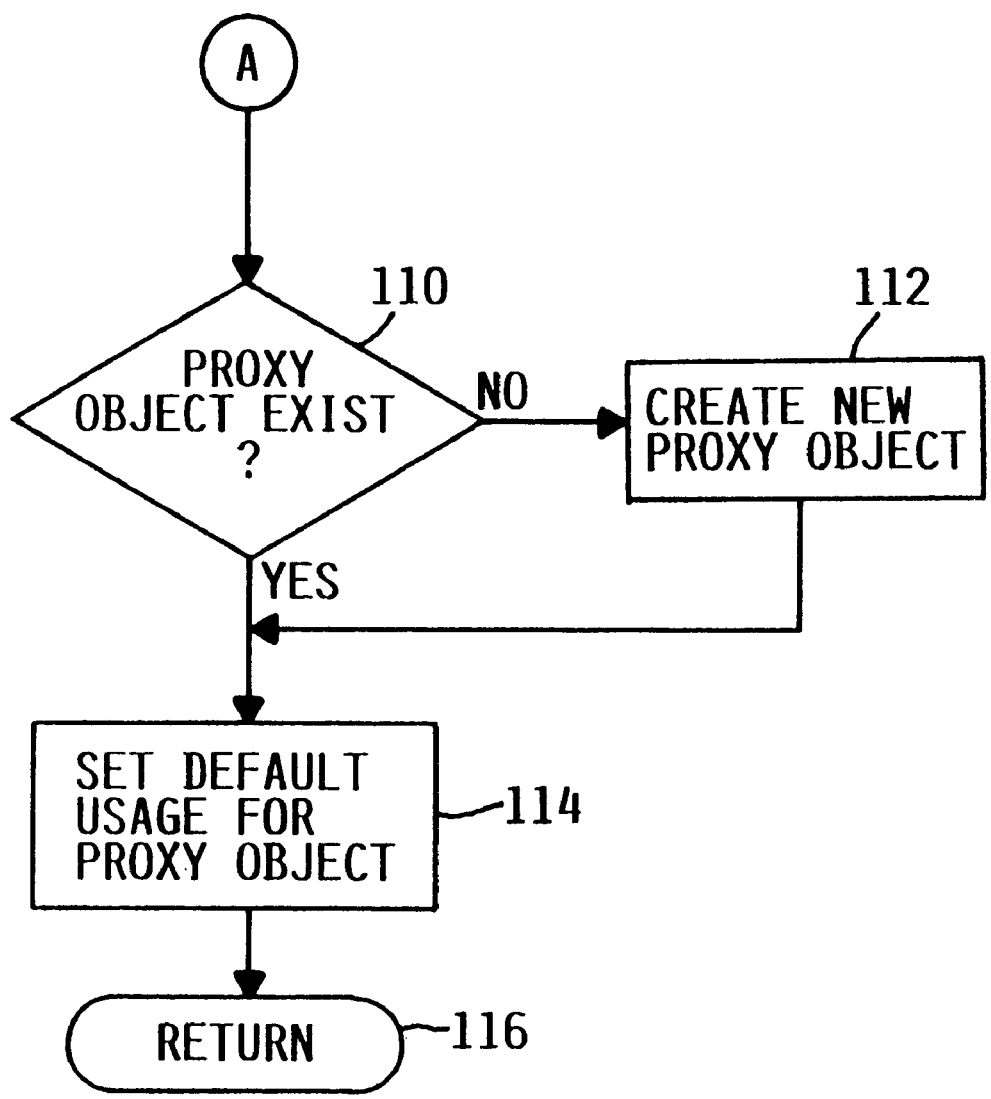

FIG. 4 illustrates in further detail the Register/Re-register API function described above with respect to step 62 (FIG. 2) that is one of API functions 60 (FIG. 1). The call to this function preferably passes as arguments a number of parameters providing information about the function, including a function identifier, which uniquely identifies the program function over other program functions, and one or more function controls. In an illustrative embodiment of the invention, the function controls include a function category, a function type, a function product identifier, a function group identifier, a default function usage indicator, an honor privileges indicator, and a re-register indicator. The inclusion of such function controls in the Register/Re-register API function call in certain embodiments of the invention may enhance ease of use and convenience for the administrator. Other suitable function control parameters may be included in addition or alternatively to those described.

The function category parameter may be used to indicate whether the program function to be registered is a client function, i.e., the executable code for it resides in and executes on the client computer (e.g., computer 10) and is included within the relevant portion of the client operating system; a client function not within that portion of the operating system; or a host function, i.e., the executable code for it resides in and executes on the host or server computer (e.g., computer 14).

The function type parameter may be used to provide further granularity or selectivity within a selected function category. For example, this parameter may be used to indicate whether the program function to be registered is a "function product," which is an abstract higher level of a function hierarchy, a "function group," which is an abstract lower level of the hierarchy, or an actual program function. In other words, in the illustrative embodiment, the function type parameter allows a hierarchy of up to three levels to be defined. Once registered, authorization selector tool 74 may use the information to display the registered program functions in a hierarchical manner. The function product and function group are not actual program functions to which the administrator can grant or deny a user access authorization, but rather are abstract levels of the hierarchy, under which one or more actual program functions may exist.

The function product identifier parameter may be used to indicate a name of a software product to which the program function relates. Authorization selector tool 74 may display the product identifier in addition to the function name as a means to aid the administrator in identifying and understanding the purpose of the program function.

The function group identifier parameter may be used to identify the program function to be registered as a member of an abstract function group that has already been defined and registered.

The default usage indicator parameter may be used to indicate whether the default authorization for the program function to be registered is "allowed," i.e., access granted, or "not allowed," i.e., access denied. If the administrator has not set a user's authorization to either grant or deny access with respect to a certain program function, an attempt by that user to access that program function is either granted or denied in accordance with this default usage indicator.

The honor privileges indicator parameter may be used to indicate whether to respect special privileges a user may have in determining whether or not to allow access. In the AS/400 platform, it is known that a user may be granted what is referred to as the all objects ("*ALLOBJ") privilege, which normally allows that user to access any object on the computing system. The honor privileges indicator parameter indicates whether a user's "*ALLOBJ" privilege should override any authorization the administrator may set using tool 74.

The re-register indicator parameter may be used to indicate whether the registration request is a request to register a new program function not previously registered or a request to update the registration information relating to an already registered program function.

As noted above, a call to the Register/Re-register API function, which may or may not include the above-described function control parameters, initiates the method illustrated in FIG. 4. At step 90 it is determined whether the user under whose control application program 56 is being installed in fact has the authority to use registry 64. (See FIG. 1.) Security mechanism 70 of operating system 66 may be set to grant or deny access to any object, including registry 64, and a typical end-user in a business environment would not likely have the privileges necessary to access registry 64. More typically, only computing system administrators or similar personnel have the necessary privileges to install new software and, in particular, access registry 64. If the user does not have these privileges, the Register/Re-register API function proceeds to step 92 and returns to the function call. Although not illustrated for purposes of clarity, a suitable step of generating an error message or similarly handling such an error condition may be interposed between steps 90 and 92 or included in place of step 92.

If the user has the necessary privilege to access registry 64, at step 94 it is determined whether the re-register indicator indicates registration of a new program function or updating an already registered function. If the former, at step 96 it is determined for error-checking purposes whether the identified program function is already registered in registry 64. If the latter, at step 98 it is similarly determined whether the program function is already registered. If the registration status of the function is contrary to the re-register indicator, the Register/Re-register API function proceeds to step 100 or 102 and returns to the function call. Although not illustrated for purposes of clarity, suitable steps of generating error messages or similarly handling such error conditions may be included in addition to or in place of steps 100 and 102. Although significant error-checking steps are illustrated, persons skilled in the art will appreciate that further steps that check for error conditions may be included throughout these API functions in accordance with routine programming practices.

If the registration request is a request to register a new program function, and that function is not already registered, at step 104 the Register/Re-register API function stores the above-described program function information in registry 64. If the registration request is a re-register request, and the program function is already registered, at step 106 it is determined whether the function type and function category specified as function control parameters match the values of those function controls already stored in registry 64. This step is included because the function type and function category preferably cannot be modified. If they match, the Register/Re-register API function proceeds to step 104, described above. If not, it proceeds to step 108 and returns to the function call. As described above with respect to with steps 100 and 102, suitable steps of generating error messages or handling the error condition may be included in addition to or in place of step 108.

Following step 104, the Register/Re-register API function proceeds to step 110, at which it is determined whether a proxy object 68 (FIG. 1) corresponding to the program function to be registered exists. If a corresponding proxy object 68 does not exist, at step 112 a new proxy object 68 is created, and the Register/Re-register API function proceeds to step 114. If a corresponding proxy object 68 exists, at step 114 the services of security mechanism 70 are invoked to set the access authorization on the proxy object 68 to the default setting indicated by the default usage indicator parameter. At step 116 the Register/Re-register API function returns to the function call.

Although not illustrated, a Deregister API function may be included for convenience that removes a registered program function from registry 64.

Figure 5:
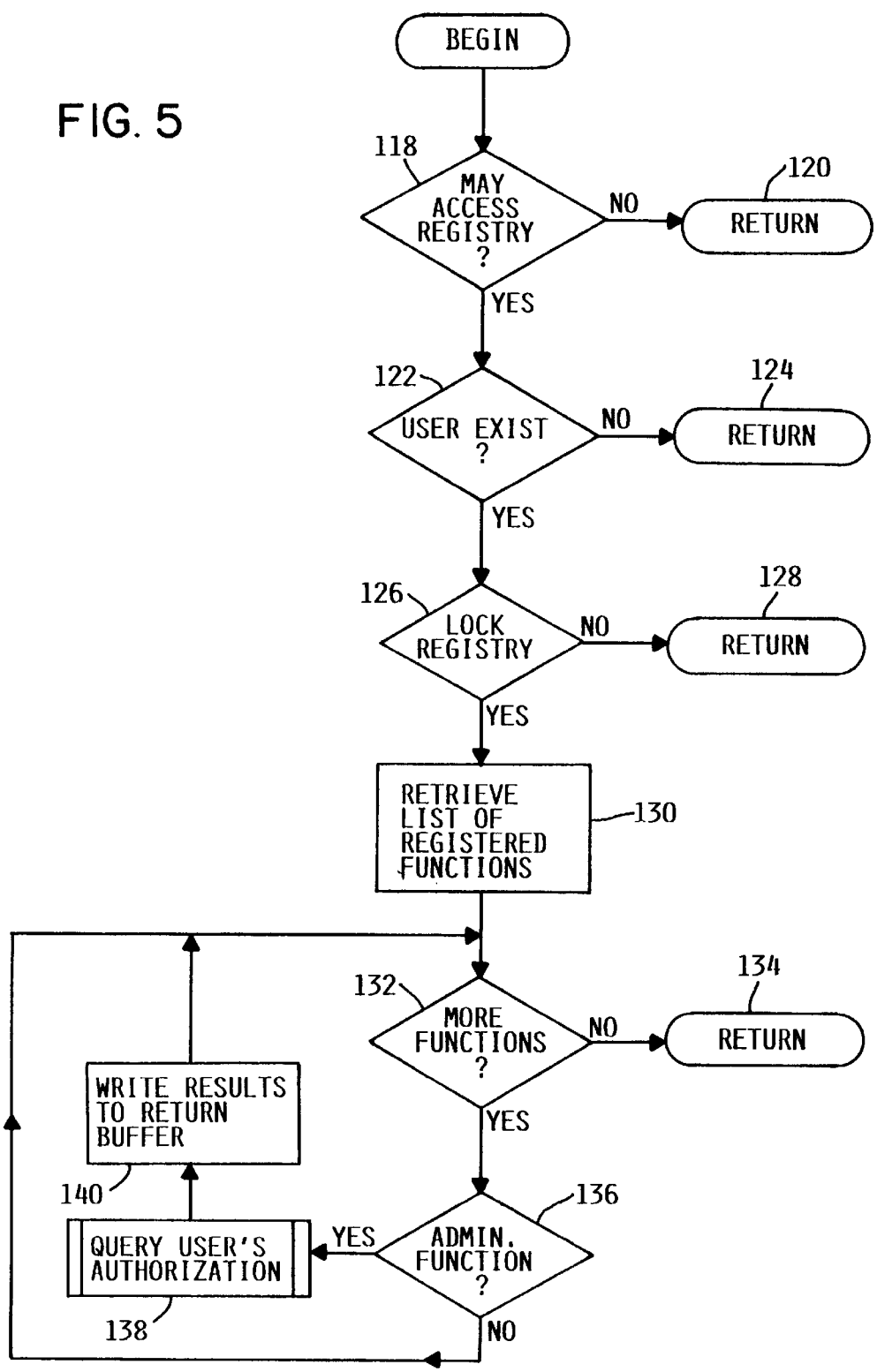
FIG. 5 is a flow diagram illustrating a method for retrieving registered program function information.

FIG. 5 illustrates a Retrieve Function Information API function that may be used with respect to step 72 (FIG. 2) and is one of API functions 60 (FIG. 1). Thus, this API function is used by authorization selector tool 74. A call to this function passes as arguments the name or similar information identifying one or more registered program functions and the username or similar information identifying a user of the computer system. In response, the function returns a buffer that has in it the information about that program function that is stored in registry 64 and the user's authority to the proxy object that accesses it. This information is described above with respect to the Register/Re-register API function.

At step 118 the Retrieve Function Information API function determines whether the user under whose control the Retrieve Function Information API function is being executed in fact has the authority to use registry 64. This step is thus similar to step 90 described above with respect to FIG. 4. Because the call to the Retrieve Function Information API function is included in authorization selector tool 74 in the illustrated embodiment of the invention, step 118 in effect determines whether it is an administrator who is using authorization selector tool 74. If it is not an administrator, the Retrieve Function Information API function proceeds to step 120 and returns to the function call and, alternatively or in addition, returns an error message or handles this error condition in some other suitable manner. If it is an administrator using tool 74, at step 122 it is determined whether the user identified by the function call parameter exists. The Retrieve Function Information API function can invoke the services of security mechanism 70 to retrieve user information in the conventional manner known in the art. If the identified user does not exist, at step 124 the Retrieve Function Information API function returns to the function call and, alternatively or in addition thereto, returns an error message or handles this error condition in some other suitable manner. If the identified user exists, at step 126 it is determined whether registry 64 can be locked or whether it is already locked by some other program or function that is simultaneously attempting to access it. If registry 64 cannot be locked, at step 128 the Retrieve Function Information API function returns to the function call and, alternatively or in addition, returns an error message or handles this error condition in some other suitable manner. If registry 64 can be locked, thus preventing concurrent access by some other program or function, the Retrieve Function Information API function proceeds to step 130.

At step 130 the Retrieve Function Information API function retrieves a list that includes information about one or more registered program functions from registry 64. At step 132, if all functions in this list have been processed, the Retrieve Function Information API function proceeds to step 134 and returns to the function call. Otherwise, it proceeds to step 136 to process the next function in the list. At step 136 it is determined whether the next program function is an administrable function, i.e., an actual program function rather than an abstract hierarchy level. If it is not an actual program function, the Retrieve Function Information API function skips it and returns to step 132 to process the next program function in the list.

Figure 7:
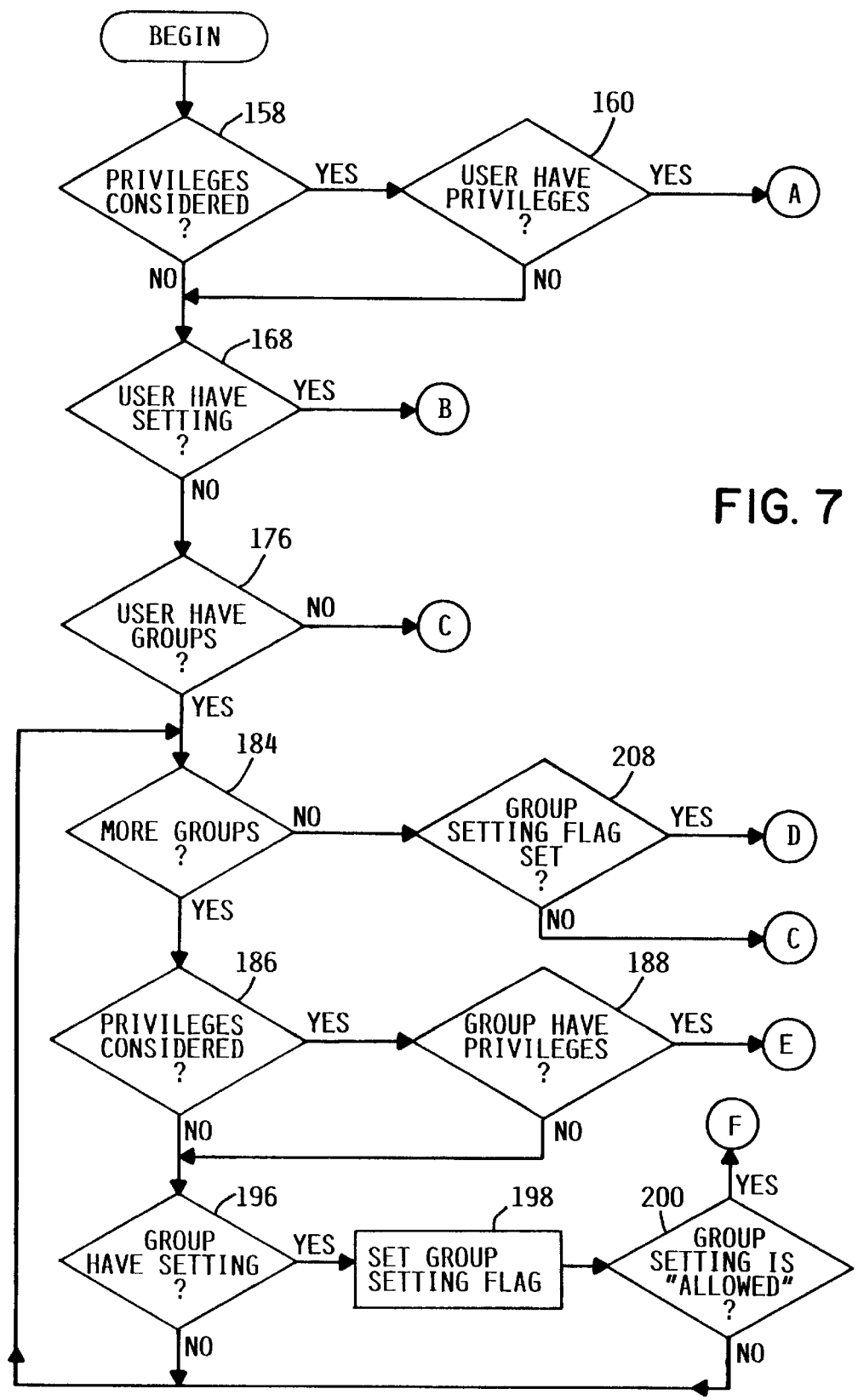
FIG. 7 is a flow diagram illustrating a method for querying a user's authorization to access a program function.

If the program function is an actual or administrable program function, at step 138 the Authorization Query API function is called. A call to this function passes as an argument the name or other information identifying a user. This user information may have been provided as an argument in the call to the Retrieve Function Information API function. In response to the call to Authorization Query API function, it returns a result indicating whether the specified user is authorized to access the specified program function. The Authorization Query API function is described below with respect to FIG. 7 in further detail. Following step 138, at step 140 the Retrieve Function Information API function writes the retrieved program function information to a buffer that the calling program can access. As noted above, when all functions in the list have been processed in this manner, control returns to the API function call at step 134.

Figure 6:
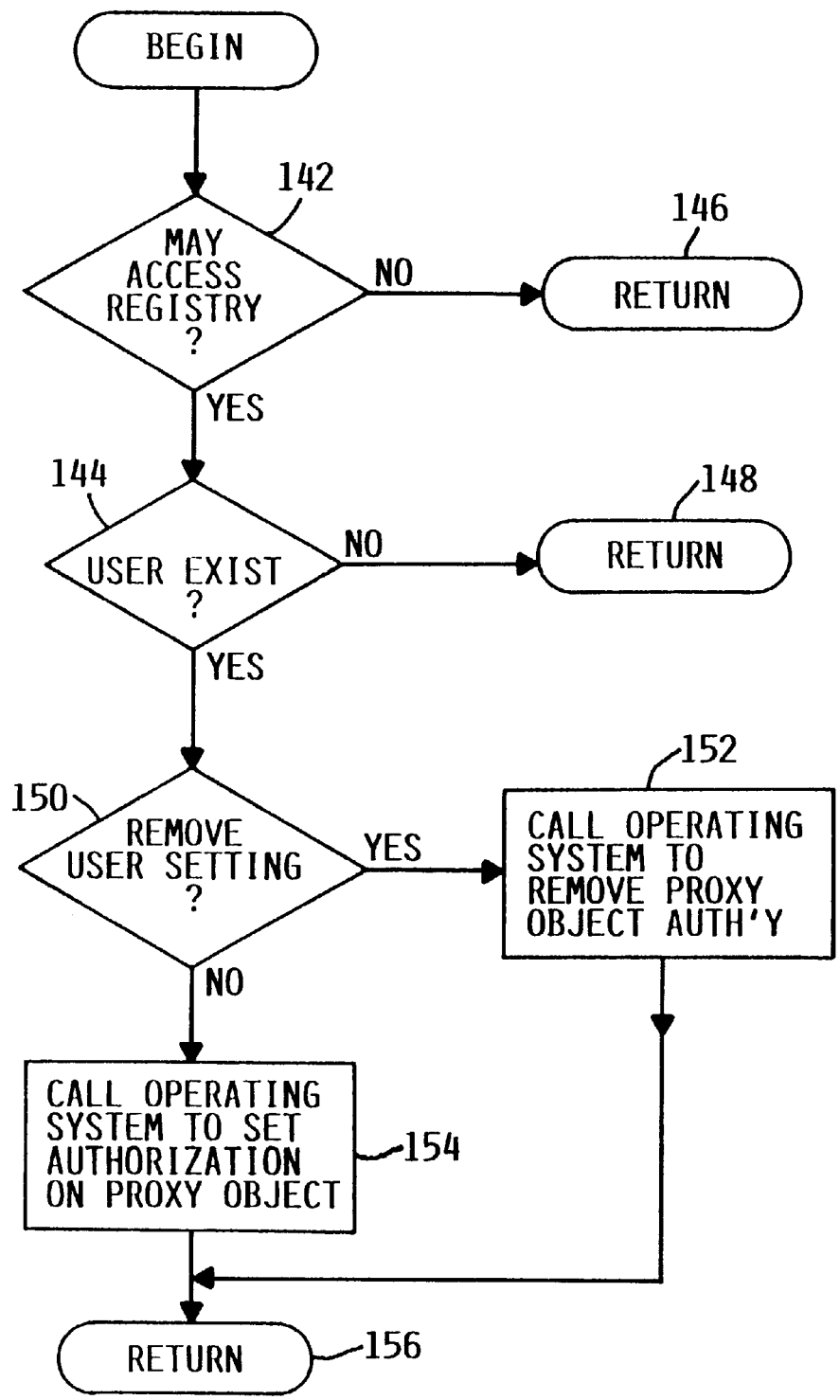
FIG. 6 is a flow diagram illustrating a method for setting and changing a user's authorization to access a program function.

FIG. 6 illustrates a Set/Change User Authorization API function that may be used with respect to step 72 (FIG. 2) and is another one of API functions 60 (FIG. 1). Thus, this API function is used by authorization selector tool 74. A call to this function may pass as arguments the name or similar information identifying a registered program function, the username or similar information identifying a user of the computer system, an authorization removal indicator, and an authorization setting. Steps 142 and 144 are similar to steps 118 and 122 described above with respect to FIG. 5, determining whether the person using tool 74 has the requisite authorization and whether the identified user exists. Steps 146 and 146 represent the returns to the function call or error handling routines. If no such error conditions arise, the Set/Change User Authorization API function proceeds to step 150.

At step 150 it is determined whether the authorization removal indicator parameter indicates that any authorization to which the identified user is currently set is to be removed. Once removed, an attempt by that user to access that program function would be resolved in accordance with the default authorization for that program function, taking into account whether privileges are to be honored. In accordance with the authorization removal indicator, the authorization is either removed at step 152 or set to the authorization setting parameter, i.e., access authorized or access not authorized, at step 154. Both steps 152 and 154 operate by invoking the services of security mechanism 70 on the corresponding proxy object 68. (See FIG. 1.) Following step 154, Set/Change User Authorization API function returns to the function call at step 156.

Figure 7A:
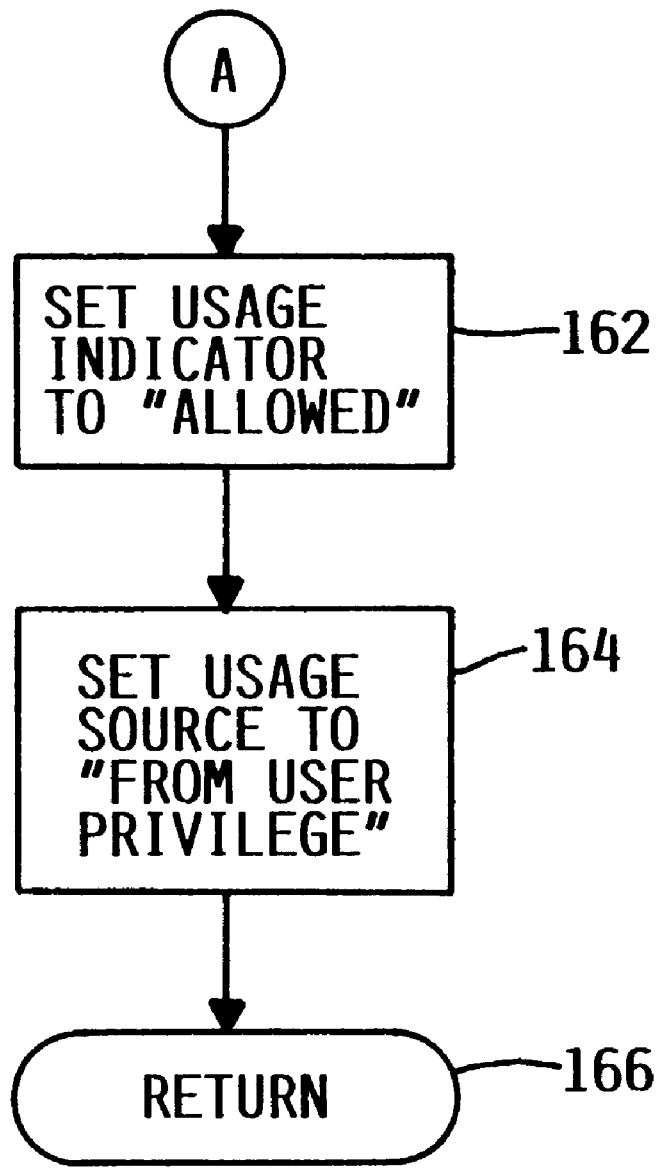
FIG. 7A is a continuation of the flow diagram of FIG. 7.
Figure 7B:
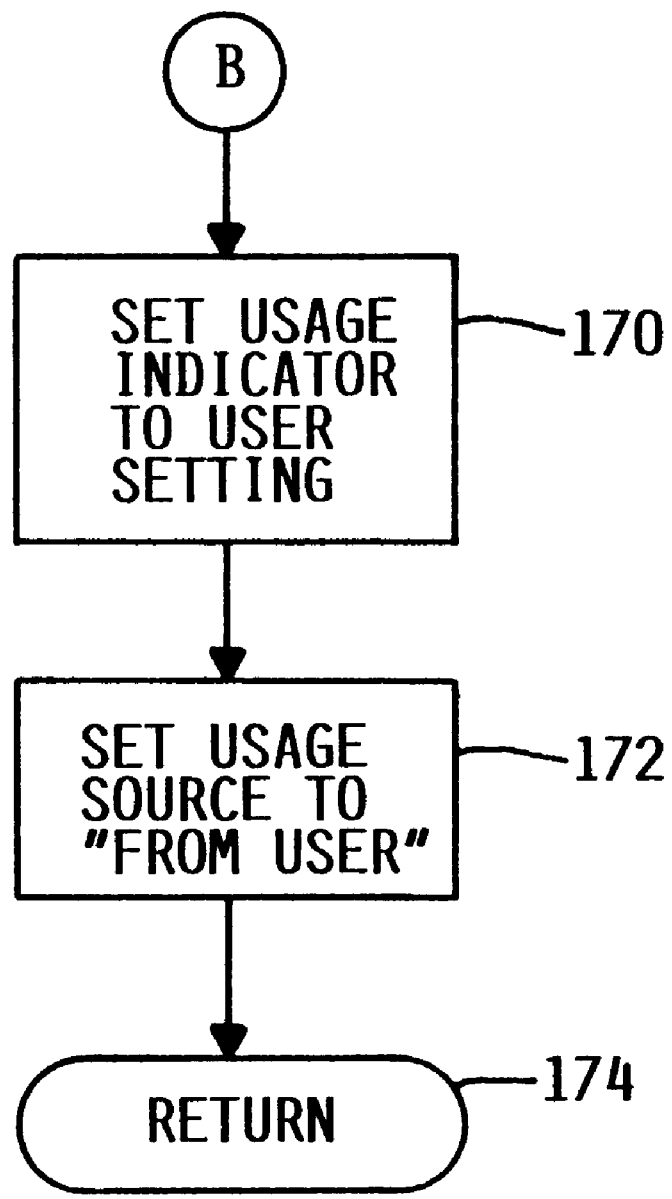
FIG. 7B is a continuation of the flow diagram of FIG. 7.
Figure 7C:
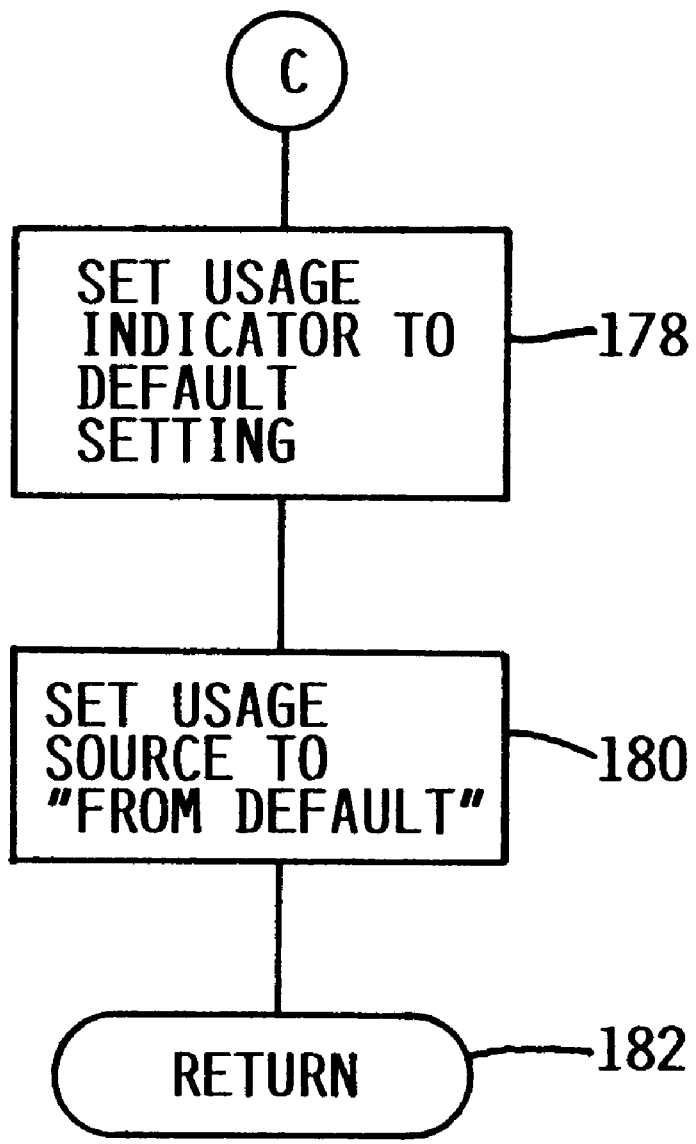
FIG. 7C is a continuation of the flow diagram of FIG. 7.
Figure 7D:
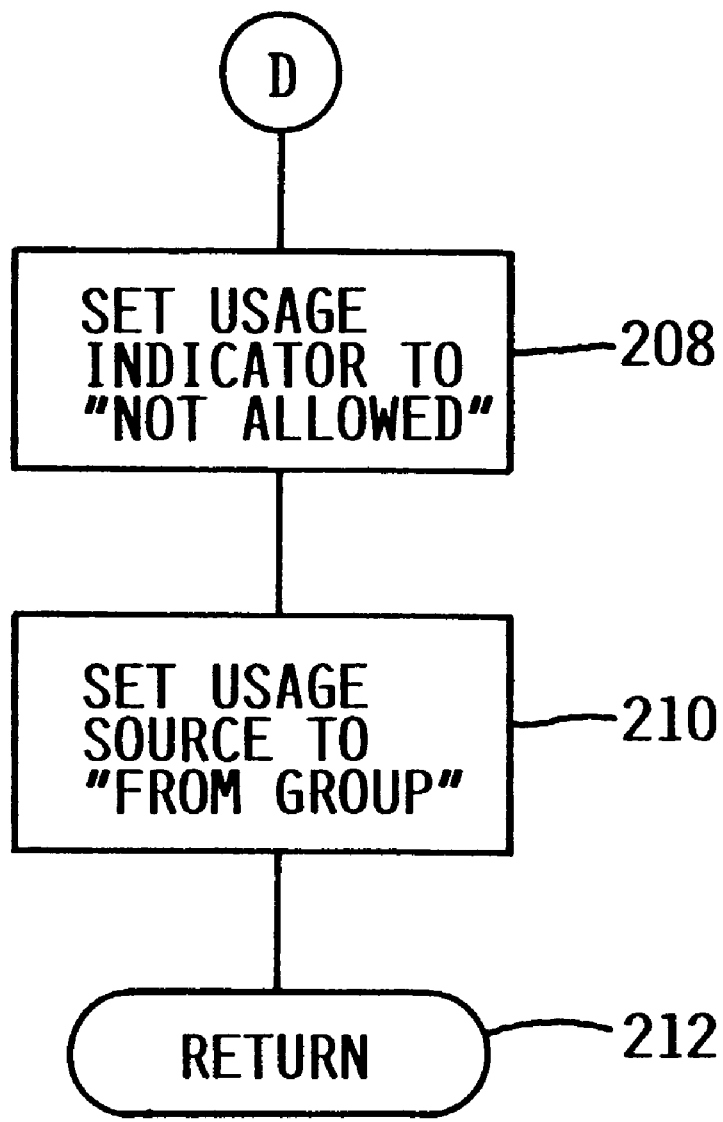
FIG. 7D is a continuation of the flow diagram of FIG. 7.
Figure 7E:
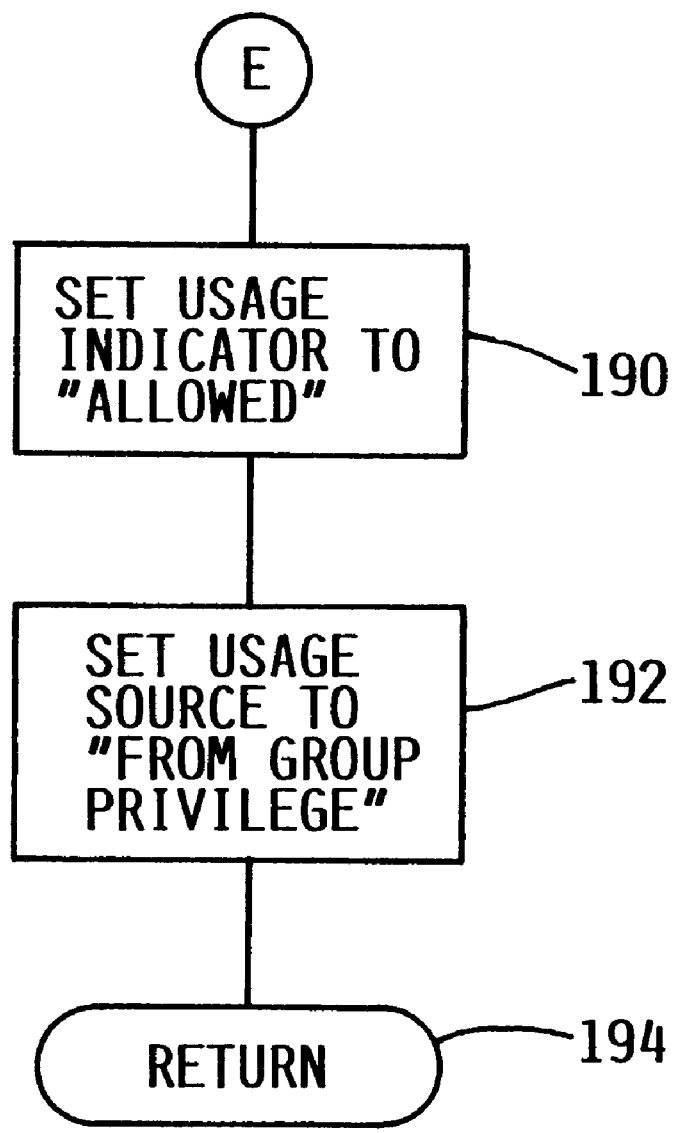
FIG. 7E is a continuation of the flow diagram of FIG. 7.
Figure 7F:
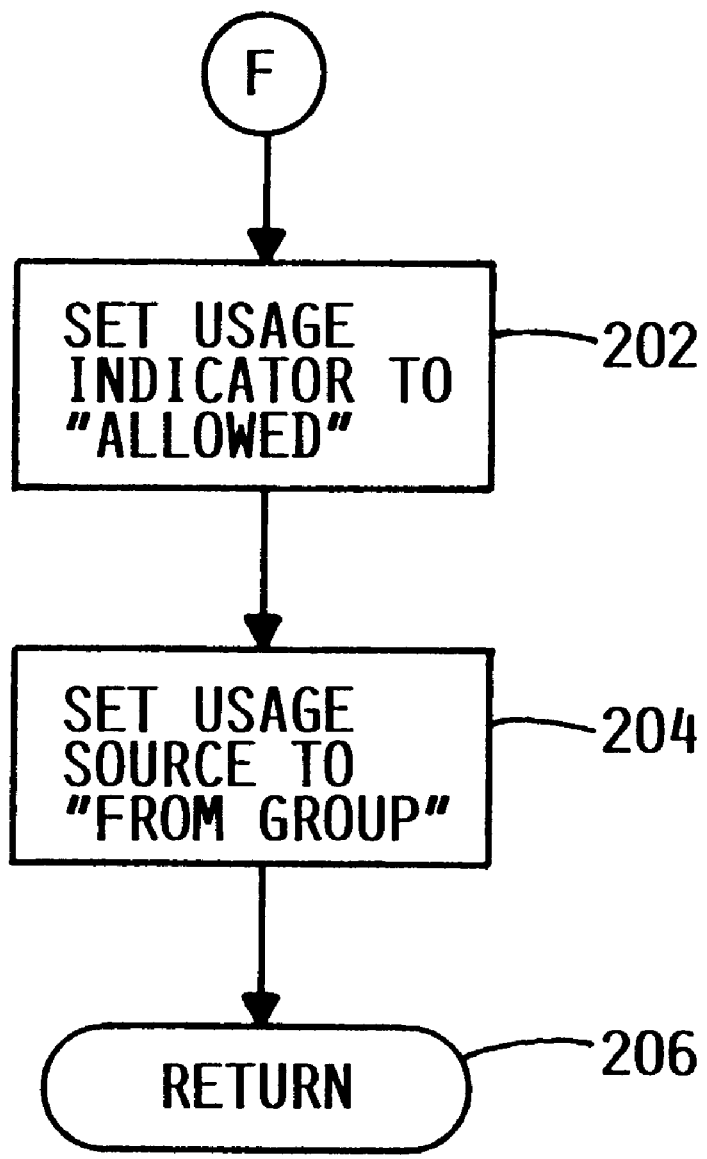
FIG. 7F is a continuation of the flow diagram of FIG. 7.

FIGS. 7 and 7A–7F illustrate the Authorization Query API function that may be used with respect to step 76 (FIG. 2) and is another one of API functions 60 (FIG. 1). Thus, this API function is called from within application program 56. (See also FIG. 3.) As described above, the user is the individual under whose control application program 56 is executing. In a networked computer system such as that illustrated in FIG. 1, the user would provide a username or other identifying information when he or she logs in to the system on computer 10. A call to the Authorization Query API function passes as an argument the name or similar information identifying a registered program function. At step 158 it is determined whether the honor privileges indicator is set to indicate that any special privileges a user may have must be respected in determining whether or not to allow access to the identified program function. If privileges are to be respected, at step 160 it is determined whether the identified user has any such privileges. If the user has such privileges, the Authorization Query API function proceeds to the step 162, illustrated in FIG. 7A. Referring briefly to FIG. 7A, the usage indicator value that is returned to the function call is set to "allowed," thereby indicating that the identified user is allowed to access the identified program function. At step 164 a usage source indicator that is also returned to the function call is set to "from user privilege." The usage source indicator provides information relating to the reason why access was allowed or not allowed. Application program 56 or other calling program may use the usage source indicator in any suitable manner. At step 166 the Authorization Query API function returns to the function call.

Returning to FIG. 7, if it is determined at step 158 that privileges are not to be considered, or if it is determined at step 160 that the user has no such privileges, then the Authorization Query API function proceeds to step 168. At step 168 it is determined from security mechanism 70 whether the identified user has any authorization setting on the proxy object 68 corresponding to the identified program function. As described above, the administrator may or may not have set a user's authorization to either grant or deny access to a certain program function. If the user's authorization is set, the Authorization Query API function proceeds to step 170, illustrated in FIG. 7B. At step 170 the usage indicator that is returned to the function call is set to the same value as the user's authorization. In other words, if the user's authorization was set to "allowed," the usage indicator is set to "allowed," and if the user's authorization was set to "not allowed," the usage indicator is set to "not allowed." At step 172 the usage source indicator is set to "from user." At step 174 the Authorization Query API function returns to the function call.

Returning to FIG. 7, if at step 168 it is determined that the user does not have any authorization setting, the Authorization Query API function proceeds to step 176. At step 176 it is determined whether any groups are defined for the user. It is known that security mechanism 70 may grant a user access to all objects belonging to a certain group via a group authorization rather than via individual authorizations for each object. Thus, the Authorization Query API function may use security mechanism 70 to determine if the user has any such groups. If the user does not have any such groups, the Authorization Query API function proceeds to step 178, illustrated in FIG. 7C. At step 178 the usage indicator is set to the default value. At step 180 the usage source indicator is set to "from default." At step 182 the Authorization Query API function returns to the function call.

Returning to FIG. 7, if at step 176 it is determined that the user has groups, the Authorization Query API function proceeds to step 184. At step 184 it is determined whether all groups have been processed. If there are more groups to process, the Authorization Query API function proceeds to step 186. Step 186 is similar to steps described above at which it is determined whether privileges are to be considered, but the privileges are that of the group being processed rather than of a specified user. If privileges are to be considered, at step 188 it is determined whether the group has any such privileges. If the group has such privileges, the Authorization Query API function proceeds to step 190, illustrated in FIG. 7E. At step 190 the usage indicator is set to "allowed." At step 192 the usage source indicator is set to "from group privilege." At step 194 the Authorization Query API function returns to the function call.

Returning to FIG. 7, if at step 186 it is determined that group privileges are not to be considered, or it is determined at step 188 that the group has no such privileges, then the Authorization Query API function proceeds to step 196. At step 196 it is determined whether the group has an authorization setting. If it does not, the Authorization Query API function returns to step 184 to process the next group. If it does, at step 198 an indicator or group authorization flag is set to note for reference at a later step that a group was found that had an authorization setting. Following step 198, at step 200 it is determined whether that setting was "allowed." If the setting is not "allowed," the Authorization Query API function returns to step 184 to process the next group. If the setting is "allowed," the Authorization Query API function proceeds to step 202, illustrated in FIG. 7F. At step 202 the usage indicator is set to "allowed." At step 204 the usage source indicator is set to "from group." At step 206 the Authorization Query API function returns to the function call.

If at step 184 it is determined that all groups have been processed, the Authorization Query API function proceeds to step 208. At step 208 it is determined if the group authorization flag is set. If the flag is set, the Authorization Query API function proceeds to step 208, illustrated in FIG. 7D. At step 208 the usage indicator is set to "not allowed." At step 210 the usage source indicator is set to "from group." At step 212 the Authorization Query API function returns to the function call. If the flag is not set, the Authorization Query API function proceeds to step 178, illustrated in FIG. 7C and described above.

The present invention may provide a solution to the problem of selectively restricting users' access to program functions independently of the type of platforms on which the users' application programs run. The above-described embodiment illustrates the invention in a computing system in which the user operates computer 10 that is connected via network 12 to computer 14 on which security mechanism 70 and registry 64 reside. Operating system 58 of computer 10 need not be the type of operating system that provides multi-user security, and may not even be the type that provides a suitable registry. An IBM AS/400 platform, for example, is a type that provides a suitable security mechanism 70 and registry 64, but a WINDOWS 95 operating system is not. Thus, by providing an AS/400 platform somewhere on the networked computing system with the above-described API functions, users' access to application program functions can be selectively restricted even if the user runs the application program on a WINDOWS 95 platform elsewhere on the networked computing system.

Other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A method for limiting access to a program function in a computer system and an application program interface with an authorization query function and a registration function, comprising the steps of:

registering said program function in a repository in said computer system by executing an application program interface function call to said registration function;

selecting user authorizations, said step of selecting user authorizations comprising the steps of:

providing a list of registered program functions to an administrator via a user interface; and for each registered program function in said list, said administrator setting an authorization corresponding to each of a plurality of users via said user interface, said authorization indicating whether said user is authorized to access said registered program function;

executing, under control of a user, an application program having access to said program function and having an embedded application program interface function call to said authorization query function, said application program interface function call situated in application program code in association with said program function protected against unauthorized access, said authorization query function returning a response in response to execution of said function call;

determining whether said response indicates said user is authorized to access said program function; and executing said program function only if said user is authorized to access said program function.

2. The method recited in claim 1, wherein said step of registering said program function in a repository comprises the step of registering said program function in a registry of an operating system having a security mechanism for granting and denying individual users access to selected files.

3. The method recited in claim 2, wherein:

said step of registering a program function in a repository further comprises the step of creating a proxy file corresponding to said program function;

said step of setting an authorization corresponding to each user of a plurality of users via said user interface comprises the step of calling said security mechanism to set an operating system user authorization for access to said proxy file; and said authorization query function generates said response in response to said operating system user authorization for access to said proxy file.

4. The method recited in claim 1, wherein said step of registering said program function in a repository is performed by execution of an installation program for installing said application in said computer system.

5. A computer program product for use in a computer system for limiting access to an application program function, said computer program product comprising at least one signal-bearing medium carrying thereon:

an application program interface comprising a registration function and an authorization query function, said registration function registering said program function in a repository in said computer system in response to execution of a function call to said registration function in said application program, said authorization query function returning a response in response to execution of a function call to said authorization query function, said response indicating whether a user under whose control said application program executes is authorized to access said program function; and an authorization selector tool comprising means for providing a list of registered program functions to an administrator via a user interface, means operable in response to input provided by said administrator via said user interface for setting an authorization corresponding to each user of a predetermined plurality of users for each registered program function in said list, said authorization indicating whether said user is authorized to access said registered program function.

6. The computer program product recited in claim 5, wherein:

said registration function registers said program function in a registry of an operating system having a security mechanism for granting and denying individual users access to selected files.

7. The computer program product recited in claim 6, wherein:

said registration function creates a proxy file corresponding to said program function;

said means operable in response to input provided by said administrator via said user interface for setting an authorization calls said security mechanism to set an operating system user authorization for access to said proxy file; and said authorization query function generates said response in response to said operating system user authorization for access to said proxy file.

8. A system for limiting access to an application program function in a computer system, comprising:

application program registration means including a function call to a registration function and including a registration function for registering said program function in a repository in said computer system in response to execution of said function call to said registration function in an application program;

application program query means including a function call to an authorization query function and including an authorization query function returning a response in response to execution of said function call to said authorization query function, said response indicating whether a user under whose control said application program executes is authorized to access said program function; and an authorization selector tool comprising means for providing a list of registered program functions to an administrator via a user interface, means operable in response to input provided by said administrator via said user interface for setting an authorization corresponding to each user of a predetermined plurality of users for each registered program function in said list, said authorization indicating whether said user is authorized to access said registered program function.

9. The system recited in claim 8, wherein:

said function call to said registration is embedded in said application program;

said registration function exists in said computer system outside said application program;

said function call to said authorization query function is embedded in said application program; and said authorization query function exists in said computer system outside said application program.

10. The system recited in claim 8, wherein said registration function registers said program function in a registry of an operating system having a security mechanism for granting and denying individual users access to selected files.

11. The computer program product recited in claim 10, wherein:

said registration function creates a proxy file corresponding to said program function;

said means operable in response to input provided by said administrator via said user interface for setting an authorization calls said security mechanism to set an operating system user authorization for access to said proxy file; and said authorization query function generates said response in response to said operating system user authorization for access to said proxy file.

12. A method for limiting access to an application program function in a computer system having a repository representing an authorization corresponding to each user of a predetermined plurality of users for each said application program function, said authorization indicating whether said user is authorized to access said program function, said computer system further having an authorization selector tool for updating said repository in response to input from an administrator setting each said authorization, the method comprising the steps of:

embedding in an application program pre-run-time portion a function call to a registration function existing in said computer system outside said application program, said registration function registering said program function in a repository in said computer system in response to execution of said function call to said registration function; and embedding in an application program run-time portion a function call to an authorization query function existing in said computer system outside said application program, said authorization query function returning a response in response to execution of a function call to said authorization query function, said response indicating whether a user under whose control said application program executes is authorized to access said program function.

13. The method recited in claim 12, wherein said registration function registers said program function in a registry of an operating system having a security mechanism for granting and denying individual users access to selected files.

14. The method recited in claim 13, wherein:

said registration function creates a proxy file corresponding to said program function;

said authorization selector tool, in response to said input from said administrator, calls said security mechanism to set an operating system user authorization for access to said proxy file; and said authorization query function generates said response in response to said operating system user authorization for access to said proxy file.

15. The method recited in claim 13, wherein said application program pre-run-time portion comprises an installation program for installing said application program in said computer system.

\* \* \* \* \*